Patented Dec. 30, 1947

2,433,612

UNITED STATES PATENT OFFICE 2,433,612

TREATMENT OF FLOUR WITH CARBON TETRACHLORIDE

Bert Dee Ingels, East Orange, N. J., assignor to Novadel-Agene Corporation, Belleville, N. J., a corporation of Delaware No Drawing. Application January 15, 1944, Serial No. 518,449

3 Claims. (Cl. 99—232)

This invention relates to the improvement of wheat and other flours, and more particularly to a method of bleaching and maturing such flours and to the resulting product.

The improving effect of chlorine and compounds of chlorine with nitrogen upon the color and maturing of wheat and other flours is known both in the prior patents and from the commercial practices. According to the latter, chlorine and a mixture of nitrosyl chloride with chlorine have been employed as bleaching and maturing agents for both bread and cake flours, as well as rye flours, and more recently for the treatment of fancy, high-grade, short patent cake flours.

For the past ten or fifteen years nitrogen trichloride has also been used to treat a large majority of the flour produced in the United States and Canada, being especially valued in the treatment of bakers and family flours, and also to improve the color and bread-making value of most of the rye flours made in the United States.

The literature and my own experience also confirm the fact that certain of the halogenated hydrocarbons have been used in flour mills and other food processing plants for many years in the control of insect infestation, carbon tetrachloride having been employed as early as 1917 to kill weevils and grain insects that infested wheat (whole grain) brought in by sailing vessels from Australia during that period. Chloropicrin, a powerful and poisonous insecticide, has been employed as a fumigant for at least fifteen years in flour mills. Also, methyl bromide and ethylene dichloride are other halogenated hydrocarbons that have come into use recently as a grain or mill fumigant.

The effects on food products that have been fumigated by the aforesaid compositions are appreciated and have been discussed in the literature, reference being made to circular No. 390, United States Department of Agriculture, July 1936. Also of interest is the article entitled "The effect of carbon tetrachloride on the milling and baking quality of wheat," Canadian Journal of Research, volume 12, 1935, pages 643, 644 and 645, reporting the experiments conducted by R. K. Lamour et al. in the treatment of wet wheat with carbon tetrachloride to inhibit spoilage thereof, and the conclusion that carbon tetrachloride does not adversely affect the baking quality of flour made from the so treated wet wheat.

Thus, on the basis of the foregoing, it may be said generally that the fumigating compounds of the character referred to, after being in contact with foods like flour for a sufficient length of time and in suitable concentration to destroy insect life, and carbon tetrachloride, when employed in the treatment of wet wheat to inhibit spoilage thereof, will leave no undesirable constituent in such food products or in the flour made from the so treated wheat.

Mention is also made of the common procedure employed by cereal chemists in removing the soluble content (mostly fat) from flour to extract flour with large quantities of ether and like solvents. There are several records in the literature showing the beneficial effects of such extraction, reference being made to The Canadian Journal of Research, volume 2, No. 3, March 1930, pages 199 and 200, reporting the extraction of 2,500 grams of flour with four 5-lb. lots of ethyl ether, or at the rate of in excess of 300,000 grams of ether to a barrel (196 lbs.) of flour.

Despite the extensiveness of the commercial practices of fumigating wheat, flour, cereal products, flour mills and warehouses with certain of the halogenated hydrocarbons as above indicated, the suggestion of employing carbon tetrachloride to inhibit spoilage of wet wheat and to the practice of extracting fats from flour by the use of solvents such as ethyl ether, no one, to the best of my knowledge, has heretofore discovered the beneficial bleaching and maturing effect of certain of the halogenated hydrocarbons such as carbon tetrachloride on wheat and like flours through the direct contact thereof with such flours in amounts effective to attain the desirable bleaching and maturing action. This is probably due in part to the fact that most of the flour in a mill or warehouse has already been bleached or matured before being packed out or stored. A more important consideration is the concentration of the fumigants outlined above, the usual recommended quantity being to use from ½ lb. to 1 lb. to 1,000 cubic ft. of space to be fumigated. With a barrel of flour (196 lbs.) having a capacity of approximately 4 cubic ft., the recommended treating rate is thus between 1 and 2 grams of active agent to 1 barrel of flour, a quantity so low that its use cannot be detected by any baking tests or by the standard color tests on bleached flour. The percentage of carbon tetrachloride remaining in the flour milled from the wet wheat treated according to Dr. Lamour's experiments discussed in the foregoing is also so low as to be undetectable by standard baking and color tests. On the other hand, the substantial amount of solvent required in flour extraction is so great that one would not, as a practical matter and for economic reasons, attempt to treat ordinary grades of flour with like amounts in commercial bleaching and maturing procedures.

I have discovered that carbon tetrachloride is a valuable bleaching and maturing agent for the various grades and kinds of wheat flour and also that carbon tetrachloride will bleach and improve the baking value of rye flours, barley flours, and soy bean flours to a comparable extent with known bleaching and maturing agents such as chlorine and nitrogen trichloride. With my discovery falling somewhere well within the range of the maximum heretofore employed as a grain fumigant and the minimum employed in extracting flour, actual experiments conducted by me indicate that the preferable and practical procedure to obtain the desired bleaching and maturing effect is to treat the flour with an amount of between 100 and 1,600 grams of carbon tetrachloride per barrel of flour, under favorable conditions.

However, it is to be understood that I do not wish to be unduly restricted to this specified, practical range in view of the fact that the time that the carbon tetrachloride is allowed to remain in contact with the flour, the moisture condition thereof, and the various grades of flour, are all factors which will control the treating rate according to the invention. For example, flour treated with carbon tetrachloride at the rate of approximately 350 grams per barrel of flour showed a very satisfactory bleaching and maturing effect after being left in contact with the flour for a 15 hour period. Whereas a quantity of flour treated at the rate of approximately 30,000 grams of carbon tetrachloride to the barrel, which was left to stand for one week before the carbon tetrachloride was evaporated, would not bake into a satisfactory loaf of bread, approximately the same amount of flour treated with a like amount of carbon tetrachloride and left to stand only 1 hour gave a good baking and bleaching test. Accordingly, the time that the carbon tetrachloride is left in contact with the flour appears to affect the amount of carbon tetrachloride that will be used, the explanation of this phenomenon probably arising out of the property of carbon tetrachloride in decomposing in the presence of water. It is thus likely that due to the moisture content of the flour, decomposition takes place and that the products thereof combined with the flour constituents form compounds that are injurious or which affect baking properties when the reaction is permitted to continue for a period as long as one week, particularly where the larger amounts of carbon tetrachloride are employed.

It is also highly probable that with improvements in the procedure a lesser amount of carbon tetrachloride than that indicated may be employed to effect satisfactory bleaching and maturing action.

I prefer carbon tetrachloride as the active bleaching and maturing agent as it possesses almost ideal properties for this purpose. Compared with water, a natural volatile ingredient of flour, carbon tetrachloride has a lower boiling point and a higher specific gravity. In the vapor stage, carbon tetrachloride is 1.43 heavier than steam. Its heat of vaporization is one-tenth that of water, and its specific heat is one-fifth that of water, whereas its vapor pressure is five times that of water at room temperature. Thus, its high vapor pressure and low heat of vaporization enables the removal of excess carbon tetrachloride from flour with a minimum consumption of energy, time and difficulty.

Moreover, carbon tetrachloride has a not unpleasant sweetish odor, is not dangerously poisonous, and it can be used with comparative safety to employees in flour mills. Since carbon tetrachloride is also a fire preventative and an insecticide, these properties in addition to its bleaching and maturing function recommend its use whenever possible.

However, my research has indicated that in addition to carbon tetrachloride, other of the halogenated hydrocarbons have a bleaching effect on flour, among which may be mentioned trichlorethylene, ethylene dichloride, and chloroform. While the first two do not appear to be desirable because of the slight odors they leave in the flour, the use of chloroform may be of advantage for certain types of flour for specialty purposes, in view of its milder action.

However, other halogenated hydrocarbons, especially the compounds of chlorine with acetylene and the cyclic compounds, offer great possibilities because certain of these are less stable than carbon tetrachloride, and thus impart quicker action or equal action with less reagent. Also among the solid halogenated hydrocarbons appear to be some compounds which, when finely enough divided, appear to possess the desired flour bleaching and maturing properties on flour.

While flour to be bleached and matured may be treated with carbon tetrachloride by the batch process, the preferable procedure is to spray the same on to a moving stream of flour in a flour mill. A typical installation of such a carbon tetrachloride process in a flour mill may comprise a suitable agitating device such as is already installed in flour mills for use in the chlorine or nitrogen trichloride treatment of flour, a spraying device for spraying the carbon tetrachloride on to the flour in the agitator, suitable regulating and metering devices for controlling and measuring the flow of the carbon tetrachloride, and a means for conducting the carbon tetrachloride from the container to such devices, either by gravity or pressure systems.

Under certain conditions as, for example, where it may be desirable to recover the carbon tetrachloride with which the flour is treated, recovery systems and additional equipment in the nature of special evaporators, tumblers and aerators may be employed, my invention is not limited thereto, as flour treated in a mill with the typical equipment outlined in the foregoing would in the ordinary mill processing be so thoroughly tumbled and aerated as it passes through the conveyors, elevators, air suction, and sifters, that no appreciable or recoverable amounts of carbon tetrachloride would in all likelihood remain in the flour when it reaches the flour packers.

Instead of spraying the carbon tetrachloride directly on to the stream of flour to be treated, it is also within the purview of my invention to treat a minor stream (or batch) of the flour with carbon tetrachloride in required amount and thereupon to mix the heavily treated minor stream or batch with a major stream or batch, experiments conducted by me having indicated that such treatment can be employed to impart to the whole mass of flour desirable bleaching and maturing properties attained by the use of carbon tetrachloride when the latter is sprayed directly on to the whole flour stream.

Having thus described what I consider to be my invention and the best mode of putting the same into practice,

I claim:

1. The herein described method of bleaching and maturing flour which comprises subjecting the flour to the action of carbon tetrachloride at the treating rate of approximately 350 grams of carbon tetrachloride to 196 lbs. of flour and for a period of approximately 15 hours.

2. The method of bleaching and maturing flour which comprises subjecting the flour to the action of carbon tetrachloride in the approximate concentration range of 100–30,000 grams per 196 lbs. of flour for a time interval in the approximate range of one hour to fifteen hours, the time being sufficient to bleach the flour and mature the same.

3. The method of bleaching and maturing flour which comprises subjecting the flour to the action of carbon tetrachloride in the approximate concentration of 30,000 grams of carbon tetrachloride per 196 lbs. of flour and for a period of approximately an hour.

BERT DEE INGELS.

REFERENCES CITED

The following references are of record in the file of this patent:

UNITED STATES PATENTS

| Number | Name | Date |
| --- | --- | --- |
| 2,343,652 | Findley | Mar. 7, 1944 |
| 1,956,620 | O'Daniel | May 1, 1934 |